(12) United States Patent
MacLachlan et al.

(10) Patent No.: US 6,281,296 B1
(45) Date of Patent: Aug. 28, 2001

(54) CURABLE PERFLUOROELASTOMER COMPOSITION

(75) Inventors: James Daniel MacLachlan, West Chester, PA (US); Peter Arnold Morken; Walter Werner Schmiegel, both of Wilmington, DE (US); Kohtaro Takahashi, Saitama (JP)

(73) Assignee: DuPont Dow Elastomers L.L.C., Wilmington, DE (US)

( * ) Notice: Subject to any disclaimer, the term of this patent is extended or adjusted under 35 U.S.C. 154(b) by 0 days.

(21) Appl. No.: 09/366,979

(22) Filed: Aug. 4, 1999

Related U.S. Application Data

(60) Provisional application No. 60/095,914, filed on Aug. 10, 1998.

(51) Int. Cl.[7] .............................. C08K 5/21; C08L 27/12
(52) U.S. Cl. ................. 525/326.3; 525/342; 525/354; 525/370; 525/374; 525/375; 525/378; 525/380; 525/381; 525/382
(58) Field of Search ................... 525/326.3, 374, 525/344, 375, 378, 381, 352, 370, 382 380

(56) References Cited

U.S. PATENT DOCUMENTS

| | | | |
|---|---|---|---|
| 3,332,907 | 7/1967 | Angelo et al. | 260/47 |
| 3,956,000 | 5/1976 | Kuhls et al. | 106/270 |
| 4,281,092 | 7/1981 | Breazeale | 526/247 |
| 4,394,489 | 7/1983 | Aufdermarsh | 525/370 |
| 4,879,362 | 11/1989 | Morgan | 526/247 |
| 5,565,512 | 10/1996 | Saito et al. | 525/340 |
| 5,637,648 | 6/1997 | Saito et al. | 525/326.3 |
| 5,668,221 | 9/1997 | Saito et al. | 525/359.3 |
| 5,677,389 | 10/1997 | Logothetis et al. | 525/340 |
| 5,688,872 | 11/1997 | Sonoi et al. | 525/350 |
| 5,789,489 | 8/1998 | Coughlin et al. | 525/370 |
| 5,789,509 | 8/1998 | Schmiegel | 526/247 |

FOREIGN PATENT DOCUMENTS

| | | |
|---|---|---|
| 0 735 095 A | 10/1996 | (EP) . |
| 1352138 | 5/1974 | (GB) . |
| WO 95/02634 | 1/1995 | (WO) . |
| WO 95/22575 | 8/1995 | (WO) . |

OTHER PUBLICATIONS

Chem Abstract 91:58432, of Grinblat et al., Vysokomol. Soyedin., Ser. A (1979), 21 (6) 1308–14.*

Grinblat et al., Polymer Science USSR (1980), 21, 1434–41.*

Derwent World Patent Index Abstract No. 79–27308B/14 for SU 606867, published 1979.

* cited by examiner

*Primary Examiner*—Donald R. Wilson

(57) ABSTRACT

Perfluoroelastomer compositions comprising perfluoroelastomers having copolymerized units of tetrafluoroethylene, a perfluoro(vinyl ether), and a nitrile-containing cure site monomer are cured with compounds that are capable of generating ammonia at temperatures of 40° C.–330° C. to produce cured compositions having excellent thermal stability. The ammonia-generating compounds also act as cure accelerators in perfluoroelastomer compositions that incorporate other curing agents.

14 Claims, No Drawings

CURABLE PERFLUOROELASTOMER COMPOSITION

CROSS-REFERENCE TO RELATED APPLICATIONS

This application claims the benefit of U.S. Provisional Application No. 60/095,914 filed Aug. 10, 1998.

FIELD OF THE INVENTION

This invention relates to perfluoroelastomer compositions having enhanced cure rate.

BACKGROUND OF THE INVENTION

Perfluoroelastomers have achieved outstanding commercial success and are used in a wide variety of applications in which severe environments are encountered, in particular those end uses where exposure to high temperatures and aggressive chemicals occurs. For example, these polymers are often used in seals for aircraft engines, in oil-well drilling devices, and in sealing elements for industrial equipment used at high temperatures.

The outstanding properties of perfluoroelastomers are largely attributable to the stability and inertness of the copolymerized perfluorinated monomer units that make up the major portion of the polymer backbones in these compositions. Such monomers include tetrafluoroethylene and perfluoro (alkyl vinyl) ethers. In order to develop elastomeric properties fully, perfluoroelastomers are typically crosslinked, i.e. vulcanized. To this end, a small percentage of cure site monomer is copolymerized with the perfluorinated monomer units. Cure site monomers containing at least one nitrile group, for example perfluoro-8-cyano-5-methyl-3,6-dioxa-1-octene, are especially preferred. Such compositions are described in U.S. Pat. Nos. 4,281,092; 4,394,489; 5,789,489; and 5,789,509.

Curing systems that incorporate tetraphenyltin have been successfully used to vulcanize nitrile-containing perfluoroelastomers. However, in certain circumstances the cure rate of such compositions is too slow for economically effective commercial production of perfluoroelastomer articles. Logothetis and Schmiegel, in U.S. Pat. No. 5,677,389, disclose ammonium salts as accelerators in combination with a variety of curing systems that crosslink perfluoroelastomers. Curable compositions containing the ammonium salts exhibit enhanced cure rate, but in some instances certain ammonium salt accelerators are not effective because of insolubility in the polymer. Saito, et al., in U.S. Pat. No. 5,565,512, disclose the use of ammonium salts of organic or inorganic acids as curing agents for perfluoroelastomers. Such compositions exhibit the same solubility problems that occur with compounds in which ammonium salts are used as accelerators. It would be beneficial to have a means for curing or for accelerating the cure rate of perfluoroelastomers that does not depend on the use of ammonium salts.

SUMMARY OF THE INVENTION

The present invention is directed to a curable perfluoroelastomer composition which contains a compound that decomposes to produce ammonia. More specifically, the present invention is directed to a curable composition comprising A. a perfluoroelastomer comprising copolymerized units of
(1) tetrafluoroethylene, (2) a perfluorovinyl ether selected from the group consisting of perfluoro(alkyl vinyl) ethers, perfluoro(alkoxy vinyl) ethers, and mixtures thereof, and (3) a cure site monomer selected from the group consisting of nitrile-containing fluorinated olefins and nitrile-containing fluorinated vinyl ethers; and A. a compound, other than an ammonium salt of an organic or inorganic acid, that decomposes at temperatures between 40° C. and 330° C. to produce ammonia.

The compound which produces ammonia acts as a curative for the perfluoroelastomer, if no other curative is present. However, when another curative is present, the compound that produces ammonia acts as a cure rate accelerator.

DETAILED DESCRIPTION OF THE INVENTION

The compositions of the present invention are based on elastomeric perfluoropolymers (hereinafter "perfluoroelastomers"), that is, substantially fully fluorinated fluoropolymers which, when cured, exhibit an elastomeric character. The perfluoroelastomers contain nitrile groups that render the polymers crosslinkable.

Perfluoroelastomers are polymeric compositions having copolymerized units of at least two principal perfluorinated monomers. Generally, one of the principal comonomers is a perfluoroolefin, while the other is a perfluorovinyl ether. Representative perfluorinated olefins include tetrafluoroethylene and hexafluoropropylene. Suitable perfluorinated vinyl ethers are those of the formula $$CF_2=CFO(R_fO)_n(R_{f'}O)_mR_f \qquad (I)$$

where $R_f$ and $R_{f'}$ are different linear or branched perfluoroalkylene groups of 2–6 carbon atoms, m and n are independently 0–10, and $R_f$ is a perfluoroalkyl group of 1–6 carbon atoms.

A preferred class of perfluoro(alkyl vinyl) ethers includes compositions of the formula $$CF_2=CFO(CF_2CFXO)_nR_f \qquad (II)$$

where X is F or $CF_3$, n is 0–5, and $R_f$ is a perfluoroalkyl group of 1–6 carbon atoms.

A most preferred class of perfluoro(alkyl vinyl) ethers includes those ethers wherein n is 0 or 1 and $R_f$ contains 1–3 carbon atoms. Examples of such perfluorinated ethers include perfluoro(methyl vinyl) ether and perfluoro(propyl vinyl) ether. Other useful monomers include compounds of the formula $$CF_2=CFO[(CF_2)_mCF_2CFZO]_nR_f \qquad (III)$$

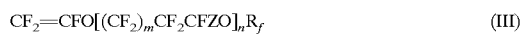

where $R_f$ is a perfluoroalkyl group having 1–6 carbon atoms, m=0 or 1, n=0–5, and Z=F or $CF_3$. Preferred members of this class are those in which $R_f$ is $C_3F_7$, m=0, and n=1.

Additional perfluoro(alkyl vinyl) ether monomers include compounds of the formula $$CF_2=CFO[(CF_2CFCF_3O)_n(CF_2CF_2CF_2O)_m(CF_2)_p]C_xF_{2x+1} \qquad (IV)$$

where m and n independently=1–10, p=0–3, and x=1–5.
Preferred members of this class include compounds where n=0–1, m=0–1, and x=1.

Examples of useful perfluoro(alkoxy vinyl) ethers include $$CF_2=CFOCF_2CF(CF_3)O(CF_2O)_mC_nF_{2n+1} \quad (V)$$

where n=1–5, m=1–3, and where, preferably, n=1.

Mixtures of perfluoro(alkyl vinyl) ethers and perfluoro(alkoxy vinyl) ethers may also be used.

Preferred perfluoroelastomers are composed of tetrafluoroethylene and at least one perfluoro(alkyl vinyl) ether as principal monomer units. In such copolymers, the copolymerized perfluorinated ether units constitute from about 15–60 mole percent of total monomer units in the polymer.

The perfluoropolymer further contains copolymerized units of at least one cure site monomer, generally in amounts of from 0.1–5 mole percent. The range is preferably between 0.3–1.5 mole percent. Although more than one type of cure site monomer may be present, most commonly one cure site monomer is used and it contains at least one nitrile substituent group. Suitable cure site monomers include nitrile-containing fluorinated olefins and nitrile-containing fluorinated vinyl ethers. Useful nitrile-containing cure site monomers include those of the formulas shown below.

$$CF_2=CF-O(CF_2)_n-CN \quad (VI)$$

where n=2–12, preferably 2–6;

$$CF_2=CF-O[CF_2-CFCF_3-O]_n-CF_2-CF(CF_3)-CN \quad (VII)$$

where n=0–4, preferably 0–2;

$$CF_2=CF-[OCF_2CF(CF_3)]_x-O-(CF_2)_n-CN \quad (VIII)$$

where x=1–2, and n=1–4; and $$CF_2=CF-O-(CF_2)_n-O-CF(CF_3)CN \quad (IX)$$

where n=2–4.

Those of formula (VIII) are preferred. Especially preferred cure site monomers are perfluorinated polyethers having a nitrile group and a trifluorovinyl ether group. A most preferred cure site monomer is $$CF_2=CFOCF_2CF(CF_3)OCF_2CF_2CN \quad (X)$$

i.e. perfluoro(8-cyano-5-methyl-3,6-dioxa-1-octene) or 8-CNVE.

The perfluoroelastomers suitable for use in the present invention may contain any of a variety of end groups as a result of the use of varying initiators or chain transfer agents during polymerization. For example, the polymers may contain sulfonate groups, sulfonic acid groups, carboxylate groups, carboxylic acid groups, carboxamide groups, difluoromethyl groups or trifluorovinyl groups.

The first embodiment of this invention is a curable composition comprising A) a perfluoroelastomer as defined above and B) a compound, other than an ammonium salt, that decomposes at temperatures between 40° C. and 330° C., preferably between 90° C.–220° C., to produce ammonia. The ammonia-generating compounds are utilized as curing agents for the perfluoroelastomers. Illustrative examples of such ammonia producing compounds include aldehyde ammonia condensation products, including acetaldehyde ammonia; and other compounds, such as hexamethylenetetramine; carbamates, for example t-butyl carbamate, benzyl carbamate, and $HCF_2CF_2CH(CH_3)OCONH_2$; urea; urea hydrochloride; thiourea; amides, such as phthalamide; metal ammine complexes, such as tetraamine copper (II) sulfate hydrate; ammonia-Lewis acid adducts; carboxamides, such as oxamic acid; biuret; unsubstituted amidines, such as formamidine, formamidine hydrochloride, and formamidine acetate. In order to be useful as a curative, the level of the compound that decomposes to produce ammonia should be about 0.1 to 7 parts compound per 100 parts perfluoroelastomer, preferably about 1 to 5 parts compound per 100 parts perfluoroelastomer.

In a second embodiment of the invention, the curable composition further comprises C) a curative other than a compound that decomposes at temperatures between 40° C. and 330° C. to produce ammonia. In this embodiment, the compound that decomposes to produce ammonia acts as a cure rate accelerator for another curative, rather than as the major curative for the perfluoroelastomer as it does in the first embodiment of the invention. The same compounds that decompose to produce ammonia that are used in the first embodiment above can be used here in the second embodiment. The level at which the ammonia producing compound is present as a cure rate accelerator is generally from 0.01 to 5 parts accelerator per 100 parts perfluoroelastomer. Preferably 0.05–3.0 parts accelerator per 100 parts perfluoroelastomer will be used. Curable perfluoroelastomer compositions containing above 5 parts accelerator per 100 parts perfluoroelastomer are generally scorchy and result in uncured compositions of high Mooney viscosity.

An appropriate level of accelerator can be selected by considering cure properties, for example the time to develop maximum MDR torque and minimum Mooney scorch of the curable compositions. The optimum level will depend on the particular combination of perfluoroelastomer and curative.

The curative that is used in the second embodiment is a compound capable of crosslinking the perfluoroelastomer, for example an organotin compound or certain amino group-containing benzene compounds. Suitable organotin compounds include allyl-, propargyl-, triphenyl- and allenyl tin curatives. Tetraalkyltin compounds or tetraaryltin compounds are the preferred organotin curing agents for use in conjunction with nitrile-substituted cure sites. Tetraphenyltin is particularly preferred. The amount of curing agent employed will necessarily depend on the degree of crosslinking desired in the final product as well as the type and concentration of reactive moieties in the perfluoroelastomer. In general, about 0.5–10 parts per hundred parts rubber, i.e. phr, of curing agent can be used, and 1–4 phr is satisfactory for most purposes. It is believed that the nitrile groups trimerize to form s-triazine rings in the presence of curing agents such as organotin, thereby crosslinking the perfluoroelastomer. The crosslinks are thermally stable, even at temperatures of 275° C. and above.

Another preferred cure system, useful for perfluoroelastomers containing nitrile-containing curesites, utilizes bis(aminophenols) and bis(aminothiophenols) of the formulas

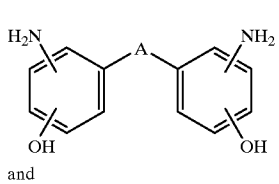

(XI)

and

-continued

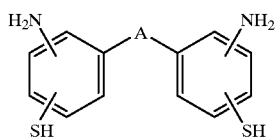

(XII)

and tetraamines of the formula

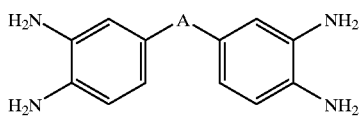

(XIII)

where A is $SO_2$, O, CO, alkyl of 1–6 carbon atoms, perfluoroalkyl of 1–10 carbon atoms, or a carbon-carbon bond linking the two aromatic rings. The amino and hydroxyl groups in formulas XI and XII above are interchangeably in the meta and para positions with respect to the group A. Preferably, the curing agent is a compound selected from the group consisting of 2,2-bis[3-amino-4-hydroxyphenyl] hexafluoropropane; 4,4'-sulfonylbis(2-aminophenol); 3,3'-diaminobenzidine; and 3,3', 4,4'-tetraaminobenzophenone. The first of these preferred curing agents will be referred to as diaminobisphenol AF. The curing agents can be prepared as disclosed in U.S. Pat. No. 3,332,907 to Angelo. Diaminobisphenol AF can be prepared by nitration of 4,4'-[2,2,2-trifluoro-1-(trifluoromethyl)ethylidene]bisphenol (i.e. bisphenol AF), preferably with potassium nitrate and trifluoroacetic acid, followed by catalytic hydrogenation, preferably with ethanol as a solvent and a catalytic amount of palladium on carbon as catalyst. Of the members of the preferred class, a particularly preferred compound is 3,3'-diaminobenzidine. Carboxylated perfluoroelastomers cured in the presence of 3,3'-diaminobenzidine show unusually good solvent resistance, as evidenced by greater resistance to volume swell in certain solvents compared to perfluoroelastomers cured in the presence of other agents. The level of curing agent should be chosen to optimize the desired properties of the vulcanizate. In general, a slight excess of curing agent over the amount required to react with all the cure sites present in the polymer is used. Typically, 0.5–5.0 parts by weight of the curative per 100 parts of polymer is required. The preferred range is 1.0–2.5 parts.

Urea, t-butyl carbamate and acetaldehyde ammonia (i.e. acetaldehyde ammonia trimer, a cyclic condensation product of 3 moles of ammonia and 3 moles of acetaldehyde, available from Aldrich Chemical Co., Milwaukee, Wis.) are particularly preferred accelerators when used with diaminobisphenol AF curative. Curable perfluoroelastomer compositions containing these curative systems are extrudable at relatively low temperatures, e.g. 60° C.–65° C., thus eliminating problems of compound scorch. In addition, acetaldehyde ammonia has a desirable plasticizing effect on the compositions.

Additives, such as carbon black, stabilizers, plasticizers, lubricants, fillers, and processing aids typically utilized in perfluoroelastomer compounding can be incorporated into the compositions of the present invention, provided they have adequate stability for the intended service conditions. In particular, low temperature performance can be enhanced by incorporation of perfluoropolyethers.

Carbon black fillers are used in elastomers as a means to balance modulus, tensile strength, elongation, hardness, abrasion resistance, conductivity, and processability of the compositions. In perfluoroelastomer compositions, small particle size, high surface area carbon blacks have been the fillers of choice. A grade commonly chosen is SAF carbon black, a highly reinforcing black with typical average particle size of about 14 nm and designated N 110 in Group No. 1, according to ASTM D 1765. A particular class of carbon blacks useful in the compositions of the present invention are those described in WO 95/22575. These carbon blacks have average particle sizes of at least about 100 nm to about 500 nm as determined by ASTM D 3849. Examples include MT blacks (medium thermal black) designated N-991, N-990, N-908, and N-907, and large particle size furnace blacks. MT blacks are preferred. When used, 1–70 phr of large size particle black is generally sufficient, and this amount does not retard cure time.

In addition, or in the alternative, fluoropolymer fillers may be present in the composition. Generally from 1 to 50 parts phr of a fluoropolymer filler is used, and preferably at least about 5 phr is present. The fluoropolymer filler can be any finely divided, easily dispersed plastic fluoropolymer that is solid at the highest temperature utilized in fabrication and curing of the perfluoroelastomer composition. By solid, it is meant that the fluoroplastic, if partially crystalline, will have a crystalline melting temperature above the processing temperature(s) of the perfluoroelastomer(s). Such finely divided, easily dispersed fluoroplastics are commonly called micropowders or fluoroadditives. Micropowders are ordinarily partially crystalline polymers.

Micropowders that can be used in the compositions of the invention include, but are not limited to, those based on the group of polymers known as tetrafluoroethylene (TFE) polymers. This group includes homopolymers of TFE (PTFE) and copolymers of TFE with small concentrations of at least one copolymerizable modifying monomer such that the resins remain non-melt-fabricable (modified PTFE). The modifying monomer can be, for example, hexafluoropropylene (HFP), perfluoro(propyl vinyl) ether (PPVE), perfluorobutyl ethylene, chlorotrifluoroethylene, or another monomer that introduces side groups into the polymer molecule. The concentration of such copolymerized modifiers in the polymer is usually less than 1 mole percent. The PTFE and modified PTFE resins that can be used in this invention include those derived from suspension polymerization as well as those derived from emulsion polymerization.

High molecular weight PTFE used in production of micropowder is usually subjected to ionizing radiation to reduce molecular weight. This facilitates grinding and enhances friability if the PTFE is produced by the suspension polymerization process, or suppresses fibrillation and enhances deagglomeration if the PTFE is produced by the emulsion polymerization process. It is also possible to polymerize TFE directly to PTFE micropowder by appropriate control of molecular weight in the emulsion polymerization process, such as disclosed by Kuhls et al. in U.S. Pat. No. 3,956,000. Morgan, in U.S. Pat. No. 4,879,362, discloses a non-melt-fabricable, non-fibrillating modified PTFE produced by the emulsion (dispersion) polymerization process. This polymer forms platelets on shear blending into elastomeric compositions, instead of fibrillating.

TFE polymers also include melt-fabricable copolymers of TFE having sufficient concentrations of copolymerized units of one or more monomers to reduce the melting point significantly below that of PTFE. Such copolymers generally have melt viscosity in the range of $0.5–60 \times 10^3$ Pa.s, but viscosities outside this range are also known. Perfluoroolefins and perfluoro(alkyl vinyl) ethers are preferred comonomers. Hexafluoropropylene and perfluoro(propyl vinyl) ether are most preferred. Melt fabricable TFE copolymers such as FEP (TFE/hexafluoropropylene copolymer) and PFA [TFE/perfluoro(propyl vinyl)ether copolymer] can be used, provided they satisfy constraints on melting temperature with respect to perfluoroelastomer processing temperature. These copolymers can be utilized in powder form as isolated from the polymerization medium, if particle size is acceptable, or they can be ground to suitable particle size starting with stock of larger dimensions.

A further preferred filler is anhydrous silica, generally an acidic silica or fumed silica. Such silicas are available from Degussa Aktiengesellschaft (Frankfurt, Germany) under the Aerosil® trademark. A particularly useful type is Aerosil® silica. Other suitable silicas include Reolosil® silicas, available from Tokuyama KK (Tokyo, Japan), for example Reolosil® QS13 silica, Reolosil® QS102 silica, and Reolosil® QS30 silica. Amounts of 1–25 phr are effective to reduce HF generation by the cured compositions during service. However, it is preferable to use no more than 1–7 phr because at higher concentrations of silica the compression set resistance of cured perfluoroelastomer compositions containing the high anhydrous silica concentrations deteriorates (i.e. increases), leading to high compression set and poor sealing characteristics. If less than 1 phr anhydrous silica is used, the degree of corrosion becomes unacceptable for many applications.

The curable compositions of the invention may be prepared by mixing the perfluoroelastomer, ammonia-generating compound, optional curing agent and other components using standard rubber compounding procedures. For example, the components may be mixed on a two roll rubber mill, in an internal mixer, for example, a Banbury internal mixer, or in an extruder. The curable compositions may then be crosslinked (i.e. cured) by application of heat and/or pressure. When compression molding is utilized, a press cure cycle is generally followed by a post cure cycle during which the press cured composition is heated at elevated temperatures in excess of 300° C. for several hours.

The curable compositions of the present invention are useful in production of gaskets, tubing, and seals. Such articles are generally produced by molding a compounded formulation of the curable composition with various additives under pressure, curing the part, and then subjecting it to a post cure cycle. The cured compositions have excellent thermal stability and chemical resistance. They are particularly useful in applications such as seals and gaskets for manufacturing semiconductor devices, and in seals for high temperature automotive uses.

The invention is now illustrated by certain embodiments wherein all parts are by weight unless otherwise specified.

EXAMPLES

Test Methods

Cure Characteristics

Cure characteristics were measured using a Shimadzu SDR-20 instrument under the following conditions:

Moving die frequency: 1.66 Hz

Oscillation amplitude: 1.0

Temperature: 204° C., unless otherwise noted

Sample size: Disks having diameter of 45 mm and thickness of 5 mm

Duration of test: 20 minutes

The following cure parameters were recorded:

$M_H$: maximum torque level, in units of N.m $M_L$: minimum torque level, in units of N.m $t_s1$: minutes to 0.04 N.m rise above $M_L$ $t_c90$: minutes to 90% of maximum torque Test specimens were prepared from elastomer compounded with appropriate additives, as described in the formulations listed in the Examples below. Compounding was carried out on a rubber mill or in a Banbury mixer. The milled composition was formed into a sheet and a 10 g sample was die cut into a disk to form the test specimen.

Cure characteristics were determined by placing a test specimen in the sealed test cavity of the instrument which was maintained under a positive pressure and elevated temperature. A biconical disk was embedded in the test specimen and was oscillated through an arc of 0.5° at the specified frequency, thereby exerting a shear strain on the test specimen. The force at maximum amplitude (torque) required to rotate the disk is proportional to the stiffness (shear modulus) of the rubber. This torque was recorded as a function of time. Because stiffness of a rubber specimen increases during curing, the test provides a measure of curability. A test is completed when the recorded torque either reaches equilibrium or maximum value, or when a predetermined time has elapsed. The time required to obtain a curve is a function of the test temperature and the characteristics of the rubber compound.

Tensile Properties

Unless otherwise noted, stress/strain properties were measured on test specimens that had been post cured under nitrogen for 24 hours at 305° C. Physical property measurements were obtained according to methods described in ASTM D 412. The following parameters were recorded:

$M_{100}$, modulus at 100% elongation in units of MPa $T_B$, tensile strength at break in units of MPa $E_B$, elongation at break in units of %

Compression set of O-ring samples was determined in accordance with ASTM D 395.

The following polymers were used in the Examples:

Polymer A—A terpolymer containing 68.2 mole percent units of TFE, 31.0 mole percent units of perfluoro(methyl vinyl) ether (PMVE) and 0.8 mole percent units of 8-CNVE prepared substantially according to the general process described in U.S. Pat. No. 5,789,489 and isolated in the presence of D65 water-based silicone defoamer, available from Dow Corning Corporation, Midland, Mich.

Polymer B—A terpolymer containing 60.24 mole percent units of TFE, 38.95 mole percent units of perfluoro (methyl vinyl) ether (PMVE) and 0.81 mole percent units of 8-CNVE prepared substantially according to the general process described in U.S. Pat. No. 5,789,489, except that the concentration of ammonium perfluorooctanoate in the polymerization mixture was twice as high. The polymer was isolated in the presence of D65 water-based silicone defoamer, available from Dow Corning Corporation, Midland, Mich.

Examples 1–2 and Control Example A

A sample of Polymer A was compounded on a two-roll rubber mill with diaminobisphenol AF, anhydrous silica, titanium dioxide, and accelerator (acetaldehyde ammonia or urea) in the proportions shown in Table I. The compounded compositions are labeled Example 1 (acetaldehyde ammonia) and Example 2 (urea) in Table I. A similar compounded composition was prepared which contained no accelerator. This composition is labeled Control A in Table I. Cure characteristics of the compounded compositions, determined using a Shimadzu SDR-20 instrument, are also shown in Table I.

TABLE I

|  | Example 1 | Example 2 | Control A |
|---|---|---|---|
| Formulation (phr)[1] | | | |
| Polymer A | 100 | 100 | 100 |
| Diaminobisphenol AF | 1.5 | 1.5 | 1.5 |
| Aerosil ® 200 anhydrous silica | 1 | 1 | 1 |
| Titanium Dioxide | 6.5 | 6.5 | 6.5 |
| Acetaldehyde Ammonia | 0.1 | 0 | 0 |
| Urea | 0 | 0.1 | 0 |
| Cure Characteristics | | | |
| $M_L$ (N.m) | 0.10 | 0.07 | 0.06 |
| $M_H$ (N.m) | 0.40 | 0.4 | 0.46 |
| $t_s1$ (minutes) | 1.1 | 0.9 | 5.3 |
| $t_c90$ (minutes) | 6.2 | 3.6 | 13.7 |
| Stress Strain Properties | | | |
| $T_B$ (MPa) | 16.1 |  | 15.4 |
| $M_{100}$ (MPa) | 2.4 |  | 2.3 |
| $E_B$ (%) | 289 |  | 287 |
| Compression Set | | | |
| @ 204° C., 70 hours (%) | 22 | 22 | 21 |
| @ 300° C., 70 hours (%) | 52 | 51 | 50 |

[1]Parts per hundred parts perfluoroelastomer

Examples 3–4 and Control B

A sample of Polymer B was compounded on a two-roll rubber mill with diaminobisphenol AF, anhydrous silica, MT carbon black, and accelerator (acetaldehyde ammonia or urea) in the proportions shown in Table II. The compounded compositions are labeled Example 3 (acetaldehyde ammonia) and Example 4 (Urea) in Table II. A similar compounded composition was prepared which contained no accelerator. This composition is labeled Control B in Table II. Cure characteristics of the compounded compositions, determined using a Shimadzu SCR-20 instrument, are also shown in Table II.

TABLE II

|  | Example 3 | Example 4 | Control B |
|---|---|---|---|
| Formulation (phr)[1] | | | |
| Polymer B | 100 | 100 | 100 |
| Diaminobisphenol AF | 1.5 | 1.5 | 1.5 |
| Aerosil ® 200 anhydrous silica | 1 | 1 | 1 |
| MT Carbon Black | 25 | 25 | 25 |
| Acetaldehyde Ammonia | 0.1 | 0 | 0 |
| Urea | 0 | 0.075 | 0 |
| Cure Characteristics | | | |
| $M_L$ (N.m) | 0.16 | 0.14 | 0.21 |
| $M_H$ (N.m) | 0.83 | 0.86 | 1.15 |
| $t_s1$ (minutes) | 0.9 | 0.9 | 2.0 |
| $t_c90$ (minutes) | 3.7 | 2.9 | 7.3 |
| Compression Set | | | |
| @ 204° C., 70 hours (%) | 13 | 9 |  |
| @ 300° C., 70 hours (%) | 32 | 33 |  |

[1]Parts per hundred parts perfluoroelastomer

Example 5

In this Example, urea was employed as the curative for the perfluoroelastomer, rather than as an accelerator for another curative. A sample of Polymer B was compounded on a two-roll rubber mill with urea, anhydrous silica and MT carbon black in the proportions shown in Table III. Cure characteristics of the compounded composition, determined using a Shimadzu SCR-20 instrument, are also shown in Table III.

TABLE III

|  | Example 5 |
|---|---|
| Formulation (phr)[1] | |
| Polymer B | 100 |
| Aerosil ® 200 anhydrous silica | 1 |
| MT Carbon Black | 25 |
| Urea | 0.3 |
| Cure Characteristics | |
| $M_L$ (N.m) | 0.13 |
| $M_H$ (N.m) | 0.84 |
| $t_s1$ (minutes) | 0.9 |
| $t_c90$ (minutes) | 1.7 |
| Compression Set | |
| @ 204° C., 70 hours (%) | 16 |
| @ 300° C., 70 hours (%) | 26 |

[1]Parts per hundred parts perfluoroelastomer

What is claimed is:
1. A curable composition comprising
   A. a perfluoroelastomer comprising copolymerized units of
      (1) tetrafluoroethylene, (2) a perfluorovinyl ether selected from the group consisting of perfluoro(alkyl vinyl) ethers, perfluoro(alkoxy vinyl) ethers, and mixtures thereof, and (3) a cure site monomer selected from the group consisting of nitrile-containing fluorinated olefins and nitrile-containing fluorinated vinyl ethers; and
   B. a compound selected from the group consisiting of acetaldehyde ammonia, hexamethylenetetramine, t-butyl carbamate, benzyl carbamate, phthalimide, urea, thiourea, tetramine copper (II) sulfate hydrate, biuret, and formamidine.
2. A composition of claim 1 wherein the compound that decomposes to produce ammonia is t-butyl carbamate.
3. A composition of claim 1 wherein the compound that decomposes to produce ammonia is acetaldehyde ammonia.
4. A composition of claim 1 wherein the compound that decomposes to produce ammonia is urea.
5. A composition of claim 1 further comprising anhydrous silica.
6. A curable composition comprising
   A. a perfluoroelastomer comprising copolymerized units of
      (1) tetrafluoroethylene, (2) a perfluorovinyl ether selected from the group consisting of perfluoro(alkyl vinyl) ethers, perfluoro(alkoxy vinyl) ethers, and mixtures thereof, and (3) a cure site monomer selected from the group consisting of nitrile-containing fluorinated olefins and nitrile-containing fluorinated vinyl ethers;
   B. a compound selected from the group consisting of acetaldehyde ammonia, hexamethylenetetramine, t-butyl carbamate, benzyl carbamate, phthalimide, urea, thiourea, tetramine copper (II) sulfate hydrate, biuret, and formamidine; and
   C. a curative other than a compound that decomposes to produce ammonia.

7. A composition of claim 6 wherein the compound that decomposes to produce ammonia is t-butyl carbamate.

8. A composition of claim 6 wherein the compound that decomposes to produce ammonia is acetaldehyde ammonia.

9. A composition of claim 6 wherein the compound that decomposes to produce ammonia is urea.

10. A composition of claim 6 further comprising anhydrous silica.

11. A composition of claim 6 wherein the curative is selected from the group consisting of organotin compounds, bis(aminophenol) compounds, bis(aminothiophenol) compounds and tetraamines.

12. A composition of claim 11 wherein the curative is tetraphenyltin.

13. A composition of claim 11 wherein the curative is diaminobisphenol AF.

14. A composition of claim 11 wherein the curative is 3,3'-diaminobenzidine.

* * * * *

UNITED STATES PATENT AND TRADEMARK OFFICE
CERTIFICATE OF CORRECTION

PATENT NO. : 6,281,296 B1
DATED : August 28, 2001
INVENTOR(S) : James Daniel MacLachlan, Peter Arnold Morken, Walter Werner Schmiegel and Kohtaro Takahashi It is certified that error appears in the above-identified patent and that said Letters Patent is hereby corrected as shown below:

Column 10,
Lines 43, 44, 45, 46, 47, 48, for each occurrence delete the phrase "that decomposes to produce ammonia".

Column 11,
Lines 1, 2, 3, 4, 5, 6, for each occurrence delete the phrase "that decomposes to produce ammonia".

Signed and Sealed this

Fifth Day of November, 2002

Attest:

Attesting Officer

JAMES E. ROGAN
Director of the United States Patent and Trademark Office